United States Patent
Johnson

(10) Patent No.: US 8,756,871 B1
(45) Date of Patent: Jun. 24, 2014

(54) METHOD AND APPARATUS FOR ATTACHING A SUPPORTED ADDITION TO A FINISHED BUILDING

(76) Inventor: Jeffrey K. Johnson, Colorado Springs, CO (US)

( * ) Notice: Subject to any disclaimer, the term of this patent is extended or adjusted under 35 U.S.C. 154(b) by 118 days.

(21) Appl. No.: 13/118,036

(22) Filed: May 27, 2011

Related U.S. Application Data

(63) Continuation-in-part of application No. 11/488,104, filed on Jul. 18, 2006, now abandoned.

(51) Int. Cl.
*E04F 19/00* (2006.01)
*E04G 23/00* (2006.01)

(52) U.S. Cl.
USPC .............................. 52/27; 52/2.14; 52/745.21

(58) Field of Classification Search
USPC .................. 52/2.14, 27, 37, 38, 40, 514, 515, 52/742.14, 742.1, 745.21
See application file for complete search history.

(56) References Cited

U.S. PATENT DOCUMENTS

| | | | | |
|---|---|---|---|---|
| 1,763,264 A * | 6/1930 | Shanks | | 52/362 |
| 2,666,354 A * | 1/1954 | Dim et al. | | 411/371.1 |
| 2,943,661 A * | 7/1960 | Stern | | 411/134 |
| 3,362,276 A * | 1/1968 | Gould | | 411/512 |
| 3,788,185 A * | 1/1974 | Gutshall | | 411/371.1 |
| 3,882,752 A * | 5/1975 | Gutshall | | 411/371.1 |
| 4,280,390 A * | 7/1981 | Murray | | 411/542 |
| 4,555,206 A * | 11/1985 | Sweeney | | 411/23 |
| 5,281,065 A * | 1/1994 | Wu | | 411/258 |
| 5,772,381 A * | 6/1998 | Olvera et al. | | 411/533 |
| 6,007,285 A * | 12/1999 | Sisto et al. | | 411/344 |
| 6,035,595 A * | 3/2000 | Anderson | | 52/363 |
| 6,709,212 B1 * | 3/2004 | Lauchner | | 411/342 |
| 7,584,582 B1 * | 9/2009 | Hutter, III | | 52/506.02 |
| 2008/0016812 A1* | 1/2008 | Johnson | | 52/514.5 |
| 2008/0082114 A1* | 4/2008 | McKenna et al. | | 606/153 |
| 2010/0212244 A1* | 8/2010 | Yu | | 52/363 |
| 2012/0131865 A1* | 5/2012 | Imkamp et al. | | 52/173.3 |

OTHER PUBLICATIONS

Attach-A-Deck, published by Jul. 25, 2009 and accessed on Feb. 28, 2013, http://web.archive.org/web/20090725143921/http://www.attachadeck.com/, p. 1-9.*
Gibson, Scott, No-Flash Ledger Connection, Nov. 2008, Profession Deck Builder, p. 1-4.*

* cited by examiner

*Primary Examiner* — Elizabeth A Plummer
(74) *Attorney, Agent, or Firm* — G. F. Gallinger

(57) ABSTRACT

A spacer comprising: a) a wall insert weather sealing cup portion having a peripheral sidewall, and a bottom sidewall which seats on a structural frame of the building; and, b) a structurally reinforced bend prevention bolt spacing sleeve portion mated to fit within the cup portion, the sleeve portion having an central axial bolt opening therethrough. After an exterior side of the structural frame of the building is sheathed the sealing cup portion can be directly attached to the structural frame of the building through a hole drilled through a wall sheathing. When the sheathed wall is finished the cup portion can be sealed in the finish thereby preventing moisture from penetrating through the wall at the enlarged hole; and, when the addition is screwed to the existing building's frame, a substantial bending moment on the screws can be sustained by the structurally reinforced bend prevention bolt spacing sleeve portion.

9 Claims, 2 Drawing Sheets

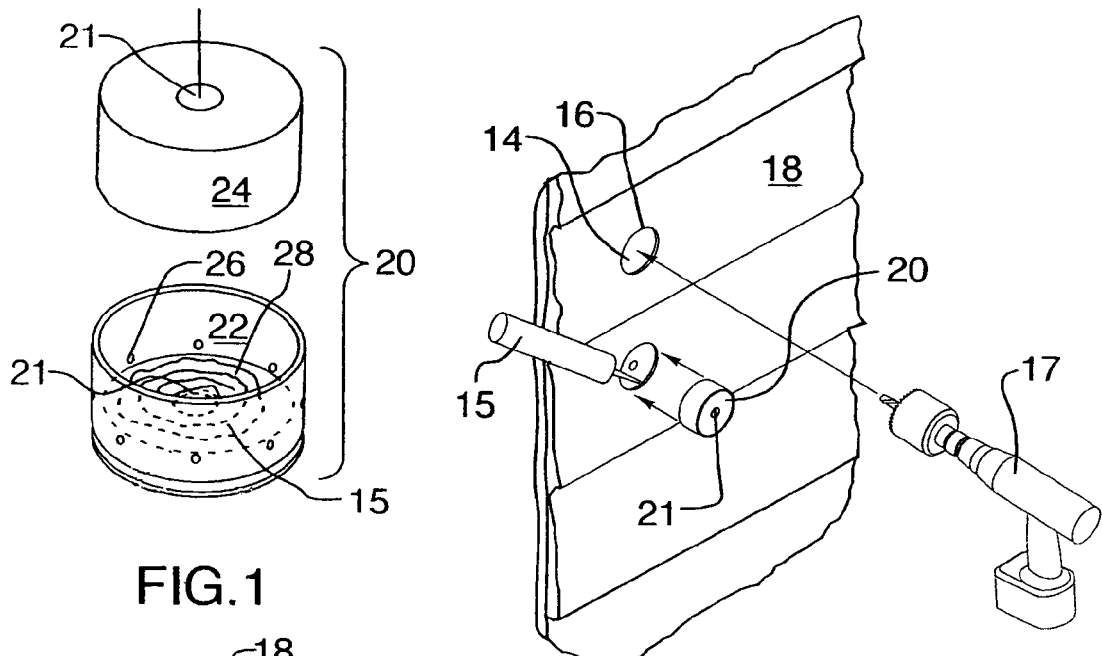
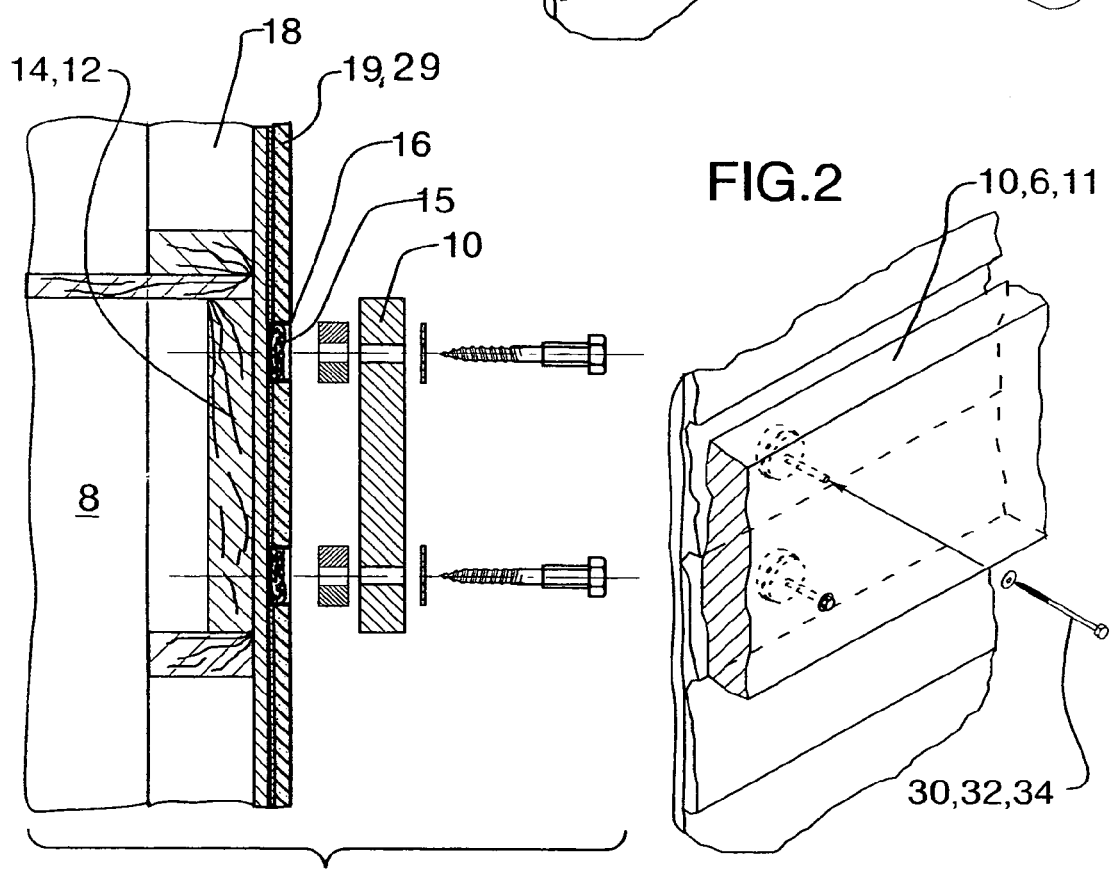
FIG.1
FIG.2
FIG.4
FIG.3

METHOD AND APPARATUS FOR ATTACHING A SUPPORTED ADDITION TO A FINISHED BUILDING

PRIOR APPLICATION

This application is filed as a Continuation In Part of U.S. application Ser. No. 11/488,104 filed Jul. 18, 2006 now abandoned by Jeffery K. Johnson.

FIELD OF THE INVENTION

This invention relates to solidly attaching an added structure such as a deck, a deck cover, or a shed to the structural frame of an existing building. More particularly this invention relates to using a spacer which attaches to the structural frame on one of its ends, sealably spaces beyond and attaches to the siding of the finished building on its central portion, to thereby provide a solid point of attachment for a new structure on its other outer end portion.

BACKGROUND OF THE INVENTION

When an added structure such as a deck, a deck cover, or a shed has an attached side which is carried by a finished building it is necessary to solidly attach the added structure to the frame of the existing building. To provide a solid point of attachment it is necessary to remove the finished exterior wall covering on the finished building. In residences the structural frame of the existing building comprises wood. Typically lag bolts are used to attach the added structure to the structural frame of the existing building. For adequate attachment it is necessary that asphalt sheathing, insulative polyurethane boards, and exterior facing (whether it be vinyl siding or stucco) be removed prior to attaching the supporting structure of the addition. The problem with removing a portion of the exterior wall of the existing building is that it presents a breech in the integrity of the finished building. The opening must be subsequently closed, preferably insulated, and permanently sealed against the elements. Reliably sealing the opening is not only an initial concern, but all too often it requires ongoing maintenance.

OBJECTS OF THE INVENTION

It is an object of this invention to disclose a simple and effective method of attaching an addition to the structural frame of an existing building. It is an object of this invention to disclose an apparatus and method of attachment which minimally breeches the existing structure's wall thereby eliminating the need for initial repair and ongoing maintenance. It is yet a further object of this invention to disclose a self sealing point of attachment to the existing building's structure for the structure of the addition. It is a final object of this invention to disclose a method and apparatus which is not only extremely effective but maximally convenient and time saving to use.

One aspect of this invention provides for a spacer for use within an enlarged hole drilled through the exterior side portion of a building's wall to expose the building's structural frame to provide a point of solid attachment for a supporting structural member of an addition screwed to frame of the finished building's frame comprising: a) a wall insert weather sealing cup portion having a peripheral sidewall, and a bottom side wall which seats on the structural frame of the building, said bottom sidewall having a central axial bolt opening therethrough; and, b) a structurally reinforced bend prevention bolt spacing sleeve portion mated to fit within the cup portion, said sleeve portion also having an central axial bolt opening therethrough. After an exterior side of the structural frame of the building is sheathed the sealing cup portion can be directly attached to the structural frame of the building through a hole drilled through a wall sheathing. When the sheathed wall is finished the cup portion can be sealed in the exterior wall finish thereby preventing moisture from penetrating through the wall at the enlarged hole; and when the addition, spaced from the finished wall is screwed to the existing building's frame, not only will a substantial bending moment on the screws be sustained by the structurally reinforced bend prevention bolt spacing sleeve portion, but additionally water running off the addition onto the finished wall will be prevented from penetrating into the wall by the wall insert weather sealing cup portion surrounding the structurally reinforced bend prevention bolt spacing sleeve portion and the screw therein.

In another aspect of this invention a method of providing a solid point of attachment for an anticipated deck on an exterior wall of a building which will be stuccoed comprises the steps of: a) removing an exterior portion of the building's wall sheathing to expose the structural frame thereunder, said removed portion having a diameter generally equal to a diameter of a wall insert weather sealing cup portion of a spacer as described above; b) sealably inserting the wall insert weather sealing cup portion of a spacer adjacent to the building's structural frame; c) stuccoing the exterior wall of the building thereby sealing the wall around the exterior of the weather sealing cup portion of the spacer; d) using the building having a weather tight wall at a solid point of attachment for an anticipated deck thereon; e) when ready to construct the deck, removing any stucco from within the wall insert sealing cup portion of the spacer; f) inserting a structurally reinforced bend prevention bolt spacing sleeve portion, as described above, within the wall insert weather sealing cup portion; and, e) attaching the supporting structural member of the addition to the structural frame of the finished building using a screw extending through the axial opening in the structurally reinforced bend prevention bolt spacing sleeve portion, and penetrating the structural frame of building. So that the structural member is thereby spaced and solidly attached to the structural frame beneath the exterior wall, ensuring that the screw will not bend while sustaining the weight of the deck, and ensuring that the weather resistant integrity of the finished wall will be maintained while subjected to water running off the deck.

Various other objects, advantages and features of this invention will become apparent to those skilled in the art from the following description in conjunction with the accompanying drawings.

FIGURES OF THE INVENTION

FIG. 1 is an enlarged exploded perspective view of a self sealing building spacer. Waterproof sealant is positioned in a bottom portion of the spacer socket.

FIG. 2 is a broken out perspective view of a finished building wall having spaced enlarged holes drilled therein. The enlarged holes are drilled through an exterior portion of the building wall to expose the supporting frame of the finished building. Spacers are inserted and closely received within the enlarged holes.

FIG. 3 is the broken out perspective view of the finished building exterior wall shown in FIG. 1 further comprising a structural member attached to the finished building structural framework thereunder. Lag bolts positioned through the addition structural member, continuing through central holes provided in the spacer plug and socket portions, finally are threaded within the structural frame beneath the exterior building wall.

FIG. 4 is an exploded cross sectional view of an exterior building wall having a structural frame which comprises a floor joist. Sealant is positioned in a bottom portion of the holes.

Figure 5:
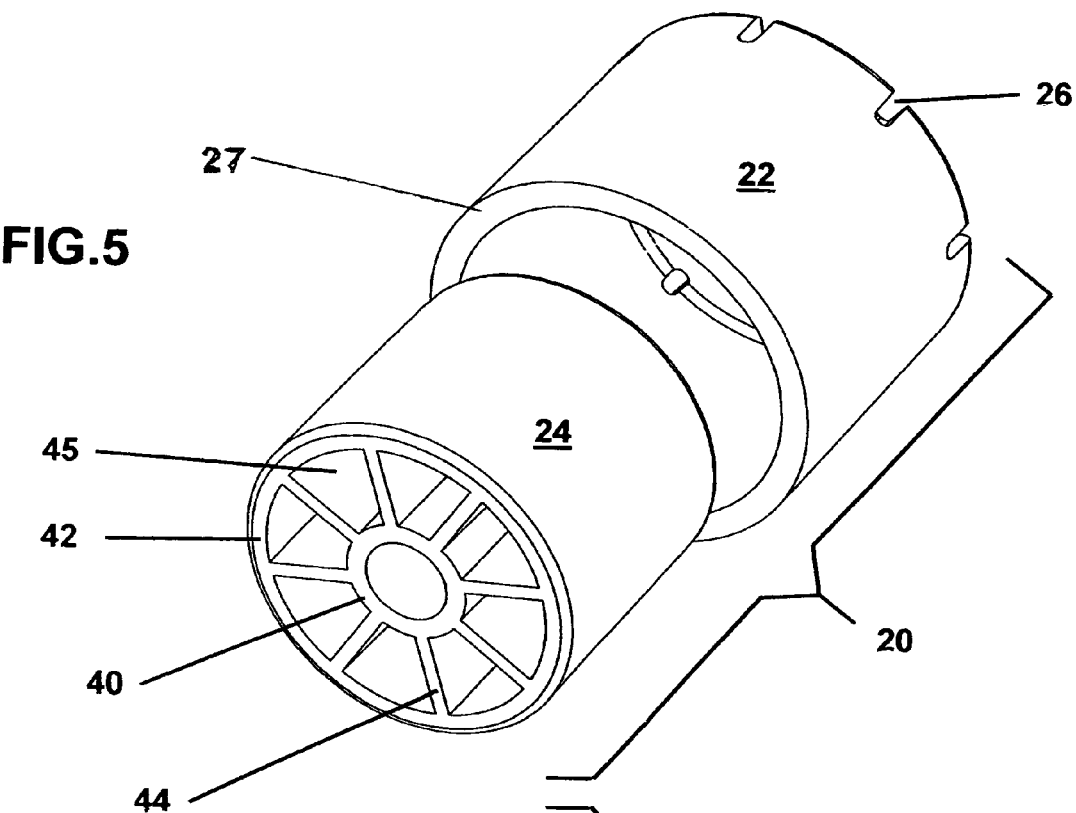
FIG. 5 is an exploded perspective view of a preferred embodiment of the siding weather sealing cup portion and a structurally reinforced bend prevention bolt spacing sleeve portion, as viewed from an exterior side of the wall.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have an enlarged exploded perspective view of a self sealing building spacer 20. FIG. 2 is a broken out perspective view of a finished building wall having spaced enlarged holes drilled therein. The enlarged holes 16 are drilled through an exterior portion of the building wall 18 to expose the building's supporting frame 14. Spacers 20 are inserted and closely received within the enlarged holes 16. FIG. 3 is the broken out perspective view of the exterior wall 18 shown in FIG. 1 further comprising a structural member 10 attached to the building's structural frame 14 thereunder. Lag bolts 32 positioned through the addition structural member 10, continuing through central axial opening 21 finally are threaded within the structural frame 14 beneath the exterior building wall 18. Most generally a spacer 20 for use within an enlarged hole 16 drilled 17 through the exterior side portion of a building's wall 18 to expose the building's structural frame 14 to provide a point of solid attachment for a supporting structural member 10 of an addition screwed to the building's frame 14 comprises: a) a wall insert weather sealing cup portion 22 having a peripheral sidewall 27, and a bottom sidewall 28 which seats on the structural building frame 14, said bottom sidewall 28 having a central axial bolt opening 21 therethrough; and, b) a structurally reinforced bend prevention bolt spacing sleeve portion 24 mated to fit within the cup portion 22, said sleeve portion 24 also having an central axial bolt opening 21 therethrough. After an exterior side of the building's structural frame 14 is sheathed 29 the sealing cup portion 22 can be directly attached to the building's structural frame 14 through a hole 16 drilled through a wall sheathing 29. When the sheathed wall 18 is finished the cup portion 22 can be sealed in the exterior wall finish 19 thereby preventing moisture from penetrating through the wall 18 at the enlarged hole 16; and when the structural member of the addition 10, spaced from the finished wall 18 is screwed to the existing building's frame 14, not only will a substantial bending moment on the screws 30 be sustained by the structurally reinforced bend prevention bolt spacing sleeve portion 24, but additionally water running off the addition onto the finished wall 18 will be prevented from penetrating therein by the wall insert weather sealing cup portion 22 surrounding the structurally reinforced bend prevention bolt spacing sleeve portion 24 and the screw 30 therein.

In a preferred embodiment of the invention, a bottom side portion of the wall insert weather sealing cup portion 20 is provided with a frame attachment opening 41 to thereby screw the cup 20 to the building's frame 14. The screw used to attach the cup 20 to the building's through the attachment opening 41 to the building's frame 14 is neither shown nor claimed herein. The central axial opening 21 is dimensioned to closely receive an inner diameter of the screw 30 extending therethrough, thereby preventing water, running off the addition, from passing through the cup portion 22 at the central axial opening 21 therein. Within this specification a screw 30 is intended and defined to include a lag bolt 32 as well as a conventional cylindrical bolt 34 having a threaded end portion to accept a nut and washer.

FIG. 4 is an exploded cross sectional view of an exterior building wall 18 having a structural frame 14 which comprises a floor joist 12. Sealant 15 is positioned in a bottom portion of the enlarged holes 16. If the exterior wall finish 19 is stucco and the wall insert weather sealing cup portion 22 is first attached to the building frame 14. Then when the sealing cup portion 22 is stuccoed thereover, it is sealed 15 therearound, and therein, so that the point of solid attachment is mostly imperceptible until the interior stuccoed portion is broken out, possibly years later, for insertion therein of the structurally reinforced bend prevention bolt spacing sleeve portion, when an addition is desired.

Figure 6:
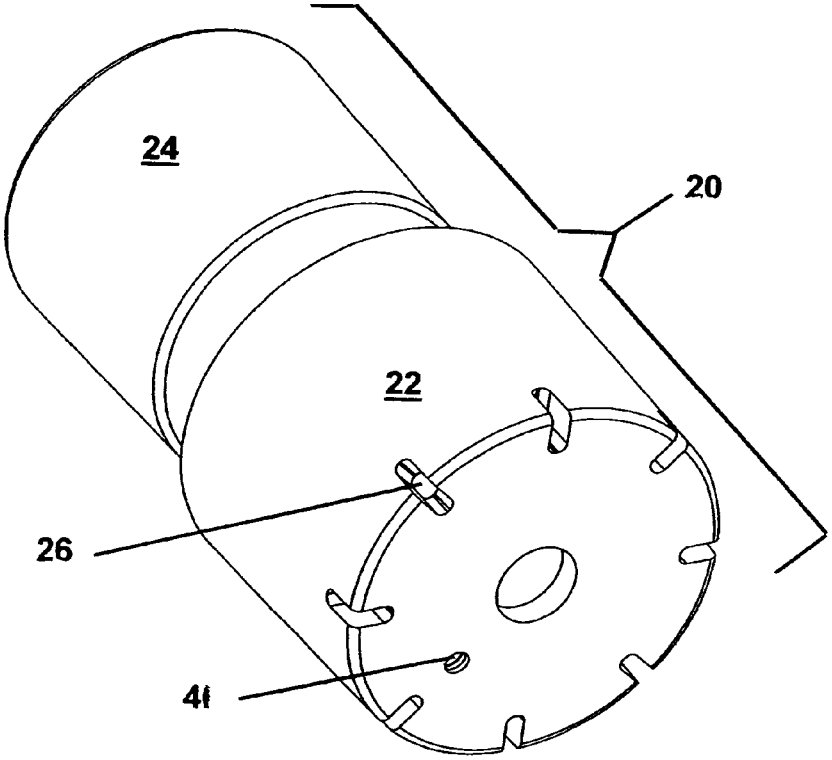
FIG. 6 is an exploded perspective view of a preferred embodiment of the siding sealing cup portion and the structurally reinforced bend prevention bolt spacing sleeve portion, as viewed from an interior side of the wall.

FIG. 5 is an exploded perspective view of a preferred embodiment of the siding weather sealing cup portion 22 and a structurally reinforced bend prevention bolt spacing sleeve portion 24, as viewed from an exterior side of the wall 18. FIG. 6 is an exploded perspective view of a preferred embodiment of the siding sealing cup portion 22 and the structurally reinforced bend prevention bolt spacing sleeve portion 24, as viewed from an interior side of the wall 18. When the bottom corner portion of the wall insert weather sealing cup portion 22 is provided peripheral openings 26 therearound so that when sealant 15 is placed in an interior bottom corner portion of the cup portion 22, immediately prior to insertion therein of the structurally reinforced bend prevention bolt spacing sleeve portion 24, the sealant 15 is subsequently is pushed through the peripheral openings 26, sealing the cup portion 22 within the wall sheathing 19.

In the most preferred embodiment of the invention the spacer 20 comprises epoxy and/or plastic. Plastic is defined and intended to include a composite nylon, which is extremely strong, but not brittle. A high density plastic which was a composite nylon was found to be extremely strong. Most preferably the structurally reinforced bend prevention bolt spacing sleeve portion 24 comprises an inner cylinder 40 dimensioned to closely receive a diameter of the screw 30, and an outer cylinder 42 dimensioned to be closely received within the wall insert weather sealing cup portion 22, so that the wall insert sealing cup portion 22 may additionally provide structural support to prevent the screw 30 therein from bending, and wherein the two cylinders 40,42 are spaced apart by several full height radial ribs 44, thereby providing even greater strength than that provided by a solid bend prevention bolt spacing sleeve portion 22. Voids 45, between the ribs 44 allow internal deformation. When the bolt 32 presses on the inner ring 40, force is applied to the outer ring 42. The bolt spacing sleeve portion 24 then applies force to the bolt spacing sleeve portion 22.

The bolt spacer 20 was tested at Washington State University, Wood Materials and Engineering Laboratory. Most generally, when using a 9/16 inch diameter bolt or lag bolt, a pair of bolt spacers 20 could support a spaced sheer load of about 3200 pounds before failing. More specifically a carried structure member 10 which was hem fir was attached and tested with a lag bolt 32 to a hem fir building frame member 14; the structure member 10 was attached with a cylindrical bolt 34 (having a nut and washer) and tested; and finally the structure member 10 was attached with a lag bolt 32 to a wood composite rim board 14 and tested. Under the three configurations a pair of bolt spacers 20 carried on average, 3200 pounds, 3800 pounds, and 2800 pounds before failing. The results are posted online under "Attach-A-Deck Spacer testing". Any deformation is contained within the bolt spacing sleeve portion 24. This is practically advantageous because deformation can occur in use without breaking the seal between the cup portion 22 and the exterior portion of the building wall 18. Under deformation the cup portion 22 does not change shape. If the bolt spacing sleeve portion 24 were solid it would crack under about one half the load. It is also noted that a solid plug of about 2½ inches cannot be injected. In the a configuration of this invention failure occurs under a shearing load when the addition structure member 10 carried by the building spacer 20 breaks. The bolt spacer 20 and the building frame 14 remain intact. The carried member 10 is not only most easily replaced but most visible. The failure is considered to be a ductile failure, rather than a catastrophic failure in as much as there is first deformation, and no complete loss of the ability to carry load.

A general method of providing a solid point of attachment for an anticipated deck 6 on an exterior wall of a building 18 which will have an exterior wall finish 19 of stucco comprises the steps of: a) removing an exterior portion of the building's wall sheathing 29 to expose the structural frame 14 thereunder, said removed portion having a diameter generally equal to a diameter of a wall insert weather sealing cup portion 22 of a spacer as described above; b) sealably inserting the wall insert weather sealing cup portion 22 of a spacer 20 adjacent to the building's structural frame 14; c) stuccoing the exterior building's wall 18 thereby sealing the wall 18 around the exterior of the weather sealing cup portion 22 of the spacer 20; d) using the building having a weather tight wall 18 at a solid point of attachment for an anticipated deck thereon; e) when ready to construct the deck, removing any stucco wall finish 19 from within the wall insert weather sealing cup portion 22 of the spacer 20; f) inserting a structurally reinforced bend prevention bolt spacing sleeve portion 24, as described above, within the wall insert weather sealing cup portion 22; and, e) attaching the supporting structural member of the addition 10 to the structural frame 14 of the finished building's wall using a screw 30 extending through the axial opening 21 in the structurally reinforced bend prevention bolt spacing sleeve portion 24, and penetrating the structural frame 14 of the building 8. So that the structural member 10 is thereby spaced and solidly attached to the structural frame 14 beneath the exterior wall 18, ensuring that the screw 30 will not bend while sustaining the weight of the deck, and ensuring that the weather resistant integrity of the finished wall 18 will be maintained while subjected to water running off the deck 6.

A method of attaching a supporting structural member 10 of an addition 11 to a building's exterior wall 18 comprises the steps of: a) removing an exterior portion of the finished building's wall to expose the structural frame 14 thereunder; b) sealably inserting a wall insert weather sealing cup portion 22 of a spacer as described above, having a bottom sidewall 28 seated on the structural frame 14, and a peripheral sidewall 27 which is positioned adjacent to the exterior portion of the finished building's wall 18, said spacer 20 having a central axial opening 21 therethrough, and a height generally similar to a thickness of the removed exterior portion of the finished building's wall 18; c) inserting the wall insert weather sealing cup portion 22 of a spacer 20, as described above, within the finished wall 18 and sealing the cup portion 22 of the spacer 20 to and within the finished wall 18; d) inserting a structurally reinforced bend prevention bolt spacing sleeve portion 24 mated to fit within the cup portion 22, as above, within the said sleeve portion 22; and, e) attaching the supporting structural member 10 of the addition 11 to the building's structural frame 14 using a screw 30 extending through the axial opening 21 in the structurally reinforced bend prevention bolt spacing sleeve portion 24. The structural member 10 is thereby spaced and solidly attached to the supporting structural frame 14 beneath the exterior wall 18, ensuring that the screw 30 will not bend while sustaining the weight of the addition 11, and ensuring that the weather resistant integrity of the finished wall 18 will be maintained while subjected to water running off the addition 11.

While the invention has been described with preferred specific embodiments thereof, it will be understood that this description is intended to illustrate and not to limit the scope of the invention, which is defined by the following claims.

I claim:

1. A spacer for use within an enlarged hole drilled through an exterior side portion of an exterior wall in an existing building, the existing building having a structural frame, wherein the enlarged hole exposes the existing building's structural frame to thereby provide a point of attachment for a supporting structural member of an addition screwed to structural frame of the existing building, the spacer comprising:

a) a wall insert weather sealing cup portion having a peripheral sidewall, and a bottom sidewall which seats on the existing building's structural frame, said bottom sidewall having a central axial bolt opening therethrough; and, b) a structurally reinforced bend prevention bolt spacing sleeve portion mated to fit within the wall insert weather sealing cup portion, said structurally reinforced bend prevention bolt spacing sleeve portion also having a central axial bolt opening therethrough;

wherein the exterior side portion of the exterior wall in the existing building is sheathed and the wall insert sealing cup portion attaches directly to the structural frame through the enlarged hole, and the enlarged hole has a diameter generally equal to an exterior diameter of the wall insert weather sealing cup portion;

such that when the exterior side portion of the exterior wall is finished, the wall insert weather sealing cup portion can be sealed in an exterior wall finish thereby preventing moisture from penetrating through the exterior wall at the enlarged hole; and wherein the addition is spaced from the exterior wall and is screwed to the existing building's structural frame with a screw, wherein a bending moment on the screw from the weight of the addition can be sustained by the structurally reinforced bend prevention bolt spacing sleeve portion and water running off the addition onto the exterior wall will be prevented from penetrating therein by the wall insert weather sealing cup portion surrounding the structurally reinforced bend prevention bolt spacing sleeve portion and the screw.

2. A spacer according to claim 1, wherein a bottom side portion of the wall insert weather sealing cup portion is provided with a frame attachment opening to thereby screw the wall insert weather sealing cup portion to the existing building's structural frame, and wherein the central axial opening of the wall insert weather sealing cup portion is dimensioned to receive a diameter of the screw extending therethrough, thereby preventing water running off the addition from passing through the wall insert weather sealing cup portion at the central axial opening therein of the wall insert weather sealing cup portion.

3. A spacer as according to claim 1, wherein the exterior wall finish is stucco and wherein the wall insert weather sealing cup portion can be sealed in a stucco portion such that the point of solid attachment is generally imperceptible until the stucco portion is removed for insertion therein of the structurally reinforced bend prevention bolt spacing sleeve portion.

4. A spacer according to claim 2, wherein the bottom corner portion of the wall insert weather sealing cup portion is provided with peripheral openings therearound such that when a sealant is placed in an interior bottom corner portion of the wall insert weather sealing cup portion immediately prior to insertion of the structurally reinforced bend prevention bolt spacing sleeve portion into the wall insert weather sealing cup portion, the sealant is subsequently pushed through the peripheral openings, sealing the cup portion within the exterior wall.

5. A spacer according to claim 1, wherein the spacer comprises epoxy or plastic, and wherein the structurally reinforced bend prevention bolt spacing sleeve portion comprises internal voids to facilitate injection molding, provide greater strength, and result in ductile failure entirely within the sleeve structurally reinforced bend prevention bolt spacing sleeve portion rather than catastrophic failure.

6. A spacer according to claim 5, wherein the structurally reinforced bend prevention bolt spacing sleeve portion comprises an inner cylinder dimensioned to receive the screw, and an outer cylinder dimensioned to be received within the wall insert weather sealing cup portion, so that the wall insert weather sealing cup portion additionally provides structural support to prevent the screw from bending, and wherein the inner and outer cylinders are spaced apart by several full height radial ribs to thereby providing greater strength than a strength provided by a solid bend prevention bolt spacing sleeve portion.

7. A spacer according to claim 5, wherein the spacer comprises high density nylon, and wherein the screw comprises a 9/16 inch diameter lag bolt, and the spacer can carry a spaced sheer load exceeding 1600 pounds before ductile failure.

8. A method of using a spacer to provide a solid point of attachment for a deck on an existing building's exterior wall, wherein the exterior wall comprises sheathing, the method comprising the steps of:
a) providing a spacer according to claim 1;
b) removing an exterior portion of the existing building's exterior wall sheathing to expose the structural frame of the existing building thereunder, wherein the exterior portion that is removed has a diameter generally equal to the diameter of the wall insert weather sealing cup portion;
c) sealably inserting the wall insert weather sealing cup portion adjacent to the existing building's structural frame;
d) stuccoing the existing building's wall thereby sealing the wall around an exterior of the wall insert weather sealing cup portion of the spacer;
e) using the existing building for attachment for of the addition, wherein the addition is a deck;
f) removing any stucco from within the wall insert sealing cup portion of the spacer;
g) inserting the structurally reinforced bend prevention bolt spacing sleeve portion within the wall insert weather sealing cup portion;
h) attaching the supporting structural member of the addition to the existing building's structural frame using the screw, wherein the screw is extending through the central axial opening in the structurally reinforced bend prevention bolt spacing sleeve portion, and penetrating the existing building's structural frame;
thereby spacing and attaching the supporting structural member to the structural frame beneath the exterior wall, ensuring that the screw will not bend while sustaining the weight of the deck, and ensuring the exterior wall will maintain a weather resistant integrity while subjected to water running off the deck.

9. A method of using a spacer to attach a supporting structural member of an addition to an exterior wall of an existing building, the method comprising the steps of:
a) providing a spacer according to claim 1;
b) removing an exterior portion of the existing building's exterior wall to expose the structural flame thereunder;
c) sealably inserting the wall insert weather sealing cup portion of the spacer, wherein the bottom sidewall of the wall insert weather sealing cup portion is seated on the structural frame, and the peripheral sidewall of the wall insert weather sealing cup portion is adjacent to the exterior side portion of the existing building's exterior wall, wherein a height of the wall insert weather sealing cup portion is generally the same as a thickness of a removed exterior portion of the existing building's exterior wall;
d) inserting the wall insert weather sealing cup portion of the spacer within the exterior wall and sealing wall insert weather sealing cup portion of the spacer to and within the exterior wall;
e) inserting the structurally reinforced bend prevention bolt spacing sleeve portion mated to fit within the wall insert weather sealing cup portion;
f) attaching the supporting structural member of the addition to the structural frame of the existing building using the screw extending through the central axial opening in the structurally reinforced bend prevention bolt spacing sleeve portion;
thereby spacing and solidly attaching the supporting structural member to the structural frame beneath the exterior wall, ensuring that the screw will not bend while sustaining the weight of the addition, and ensuring that the weather resistant integrity of the finished wall will be maintained while subjected to water running off the addition.

* * * * *